United States Patent
Robinson

(10) Patent No.: US 12,278,454 B2
(45) Date of Patent: Apr. 15, 2025

(54) ELECTRICAL CONNECTORS WITH THIN INTERIOR WALLS

(71) Applicant: YAZAKI CORPORATION, Tokyo (JP)

(72) Inventor: Troy Dean Robinson, Camarillo, CA (US)

(73) Assignee: YAZAKI CORPORATION, Tokyo (JP)

( * ) Notice: Subject to any disclaimer, the term of this patent is extended or adjusted under 35 U.S.C. 154(b) by 330 days.

(21) Appl. No.: 17/805,668

(22) Filed: Jun. 6, 2022

(65) Prior Publication Data
US 2022/0393419 A1 Dec. 8, 2022

Related U.S. Application Data

(60) Provisional application No. 63/197,878, filed on Jun. 7, 2021.

(51) Int. Cl.
| | |
|---|---|
| B29C 48/08 | (2019.01) |
| B29C 48/00 | (2019.01) |
| B29C 63/00 | (2006.01) |
| H01R 13/504 | (2006.01) |
| H01R 43/20 | (2006.01) |
| B29L 31/34 | (2006.01) |

(52) U.S. Cl.
CPC ......... *H01R 43/20* (2013.01); *B29C 48/0022* (2019.02); *B29C 48/08* (2019.02); *B29C 63/0073* (2013.01); *H01R 13/504* (2013.01); *B29L 2031/3493* (2013.01)

(58) Field of Classification Search
CPC ....... B29C 43/203; B29C 43/24; B29C 43/30; B29C 48/0022; B29C 48/08; B29C 48/71; B29C 48/305; B29C 48/92; H01R 43/20; H01R 13/504
See application file for complete search history.

(56) References Cited

U.S. PATENT DOCUMENTS 3,622,418 A * 11/1971 Black ............... B29C 59/04
264/339
2014/0155540 A1* 6/2014 Imai ............... C08L 71/08
524/592

* cited by examiner

*Primary Examiner* — Nahida Sultana
*Assistant Examiner* — Mohamed K Ahmed Ali
(74) *Attorney, Agent, or Firm* — PERKINS COIE LLP; Viola Kung; Alberto Araiza

(57) ABSTRACT

An electrical connector with thin interior walls is made by extruding a polymer or polymer composite into a sheet of approximately 0.25 mm to 0.5 mm thickness. The sheet is then calendered to a thickness of about 0.05 mm to 0.3 mm. The calendered sheet is cut into notched sections. The notched sections are assembled and placed into an injection molded housing of a connector. The sections are secured in place by using an adhesive, force fit, snap fit, or welding process to form the thin interior walls of the connector.

13 Claims, 8 Drawing Sheets

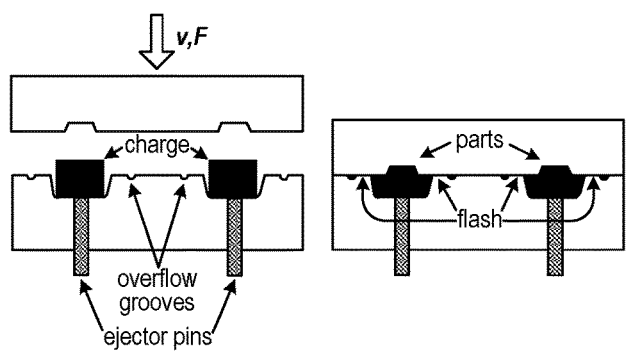
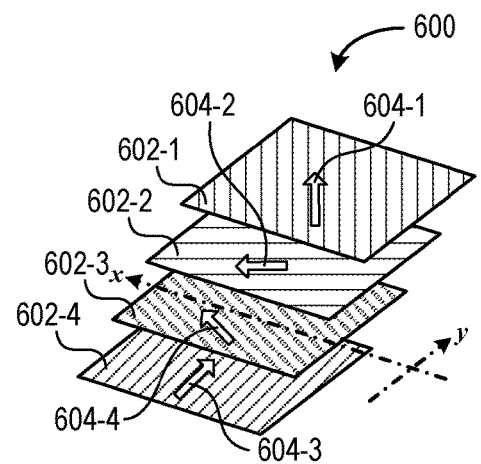
FIG. 6A       FIG. 6B
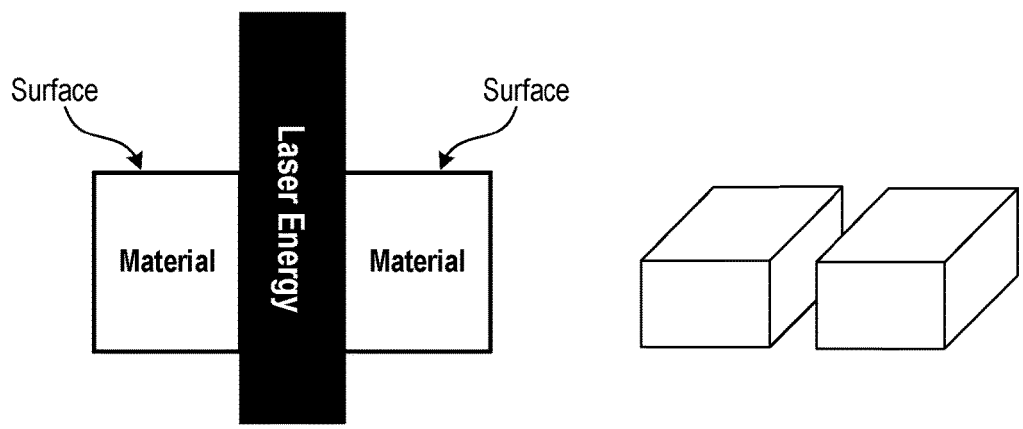
FIG. 7

ELECTRICAL CONNECTORS WITH THIN INTERIOR WALLS

CROSS REFERENCE TO RELATED APPLICATION

This application claims priority to U.S. Provisional Patent Application No. 63/197,878, filed Jun. 7, 2021. The contents of the application are incorporated herein by reference.

TECHNICAL FIELD

The disclosed teachings relate to electrical connectors with thin interior walls disposed therein.

BACKGROUND

An electrical connector is an electromechanical device used to join electrical conductors and create an electrical circuit. Most electrical connectors are classified as having a gender, e.g., the male component, called a plug, connects to the female component, or socket. The connection may be removable (as for portable equipment), require a tool for assembly and removal, or serve as a permanent electrical joint between two points.

The electrical connectors are examples of injection molded parts. Injection molding is a manufacturing process for producing parts by injecting molten material into a mold. Injection molding can be performed with a host of materials including metals, glasses, elastomers, confections, and most commonly thermoplastic and thermosetting polymers. Typically, material for the part is fed into a heated barrel, where it melts and is then driven by a helical screw into a mold cavity, where it cools and hardens to the shape of the cavity. Injection molding is widely used for manufacturing a variety of parts, from the smallest components such as electrical connectors to entire body panels of cars.

SUMMARY

Embodiments include an electrical connector with an interior wall thickness of 0.05 mm to 0.3 mm (referred to herein as a "thin wall"), which is made by extruding a polymer or polymer composite into a sheet of approximately 0.25 mm to 0.5 mm in thickness followed immediately by calendering to a thickness of 0.05 mm to 0.3 mm. The calendered sheet is cut into notched sections. The notched sections are used to assemble an entire connector, placed into slots of an existing connector forming the interior walls, and/or assembled into the desired grid pattern making an insert. The assembled insert is placed into an injection molded housing of the connector. The sections or insert are secured in place by using an adhesive, force-fit, snap-fit, or welding process.

BRIEF DESCRIPTION OF THE DRAWINGS

One or more embodiments of the present disclosure are illustrated by way of example and not limitation in the Figures of the accompanying drawings, in which like references indicate similar elements.

FIG. 6A illustrates compression molding of a preformed puck into a part.

FIG. 6B illustrates a multilayer compression molded sheet.

FIG. 7 illustrates an example of a plastic material being cut with a laser.

Figure 1:
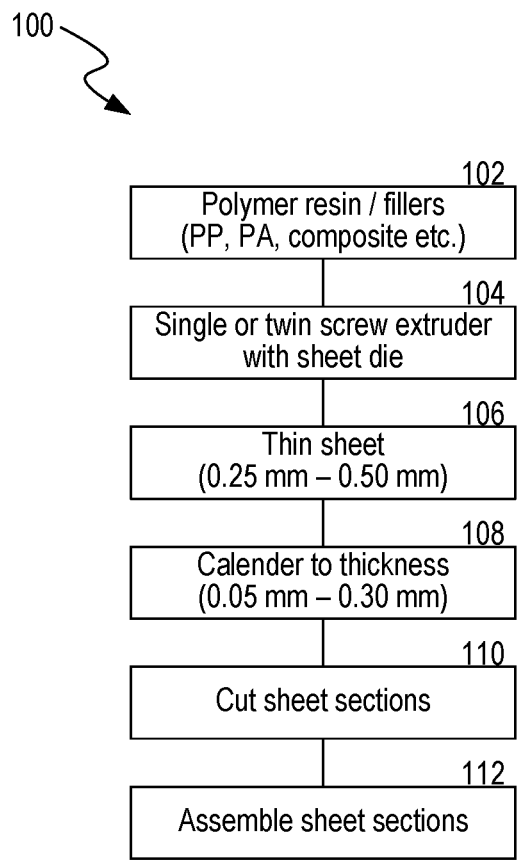
FIG. 1 is a flowchart that illustrates an extrusion and calendering process to make a continuous 0.05 mm thick polymer or composite sheet.

Various features of the embodiments described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed embodiments include electrical connectors with interior thin walls and methods for making the connectors. As used herein, a "thin wall" can refer to a wall with a thickness of about 0.05 mm to 0.3 mm. In one embodiment, the thickness is between about 0.05 and 0.2 mm. In another embodiment, the thickness is between about 0.1 and 0.3 mm. In yet another embodiment, the thickness is between about 0.1 and 0.2 mm. In one example, thin sections of a plastic material are cut and assembled like a cardboard insert (e.g., used for shipping bottles). The sections are each inserted into a connector housing to form interior walls or are assembled as an insertable structure and placed in the interior of the housing.

The disclosed techniques for assembling thin sections of interior walls of a connector overcome issues such as an incomplete filling, which arises in injection molding. For example, injection molding requires a high pressure to fill a mold with molten material (e.g., polymer melt). A "short shot" refers to an injection molding defect that results when the molten material condenses (e.g., solidifies) prematurely, before the mold is completely filled with the molten material. When a polymer melt is injected into the mold, the melt front encounters a relatively low temperature core surface or cavity wall. As such, contact with the mold forms a condensation layer on the surface. As the polymer melt continues to flow, the thickness of the condensed polymer layer increases. At some point the viscosity of the melt exceeds the injection pressure, which results in a short shot or incomplete mold filling.

The thickness of most injection molded parts is generally greater than 1 mm. As such, the influence of the condensation layer is not significant. However, when the thickness of the part is less than 1 mm, the influence of the condensation layer of the melt flow into the mold increases exponentially. Accordingly, relatively high injection speeds and high injection pressures are required to entirely fill a mold that has thin walls before the polymer solidifies.

High clamping pressures are also required to keep the mold shut (e.g., closed, sealed) during the injection process or the mold will push open, which results in flashing on the fabricated part. Thus, conventional injection molding machines are incapable of generating the high injection speeds, pressures, or clamping forces necessary for molding parts with multiple thin walls. Moreover, the melt flow index (MFI) for polymers used for injection molding thin wall parts are typically >50 g/10 minute range. The high melt flow is no guarantee the mold will fill entirely. Therefore, injection molding of composite materials is not possible with conventional techniques.

In addition, injection molding machines and molds are cost-intensive. For example, molds are machined to make a specific part, and similar parts that are larger or smaller in size require machining different molds. Moreover, repairs to a mold are cost-intensive. Further, repairing a damaged mold used to produce thin-walled connectors may be impossible. As such, machining a replacement mold is necessary but cost-prohibitive.

Connectors are examples of injection molded parts, which are commonly injection molded from a single polymer and have one function. Connectors with thin walls may require some type of filler to form composite materials that make the thin walls stiff enough to withstand handling or connecting the male and female components. However, the fillers increase the viscosity of the melt and require even higher injection pressures to fill the mold compared to connectors without thin walls. Accordingly, a composite thin wall connector is impractical or even impossible to injection mold in some applications.

Assembling Connectors From Component Parts

The disclosed solution includes techniques for assembling connectors from component parts. A connector can be assembled from different polymer components. In one example, a connector housing is molded from nylon and the interior walls are assembled from any polymer or similar material with a low coefficient of friction. An example of a polymer with a low coefficient of friction is Teflon. The resulting connector requires low insertion force. Depending on the particular application, metal, ceramics, and other materials can be used.

The connector can be assembled from modular components, which can be more versatile and economically feasible compared to a connector having a unitary structure. Depending on the mode of construction, modular components might be replaceable without needing to replace the entire connector. As such, a modular component with high wear areas can be replaced instead of replacing the entire connector. Hence, a connector formed of modular components can offer cost savings. Moreover, modular components can have different structures such that changing one modular component can change the function of the connector. Examples include swapping, adding, or removing a modular component depending on an application. In one example, once a connector housing is molded, inserts with different functionalities can easily be exchanged. This can provide cost savings in the manufacturing process as well, since a connector housing of a particular design can be used with a variety of mating inserts having, for example, different numbers of connector sockets or different socket configurations depending on the application.

The disclosed embodiments include an assembly of thin plastic sections that form interior walls of a connector, which eliminates the high pressures required for injection molding. For most connectors, the exterior connector shape can remain injection molded without the thin wall interior. This reduces the injection pressure and reduces the mold machining costs. In one example, thin sections are extruded, calendered to the desired thickness, and cut to form the interior wall sections. The sections are assembled into an insert and placed into the interior of the connector. Depending on the application, the sections can be placed directly into the connector during assembly. The disclosed process allows for fillers to be added for wall stiffness that would not be possible with an injection molding process. Moreover, the assembly method is easily tailored for different connector types and sizes, which avoids machining costs of individual injection molds.

An example of an embodiment includes a connector with an interior wall thickness of 0.05 mm, which is made by extruding a polymer or polymer composite into a sheet of approximately 0.25 mm in thickness followed by calendering to a thickness of 0.05 mm. In one example, the polymer or polymer composite includes a pigment or surface treatment that is absorbent to laser light. The calendered sheet is cut into notched sections. Alternatively, commercially available films of a desired thickness and composition can also be used and cut. The cut sections can be used to assemble an interior of the connector, placed into slots of an existing connector forming the interior walls, or assembled into the desired grid pattern making an insert. The assembled insert is placed into an injection molded connector housing. The sections or insert are secured into place using an adhesive, force-fit, snap-fit, or welding process. In another example, the sections or insert are secured into place by laser welding the grid of thin walls to the one or more surfaces of the interior of the housing.

Thin Sheet Formation

FIG. 1 illustrates a process 100 for manufacturing a thin sheet that is cut for interior thin walls of a connector. At 102, a polymer resin and/or filler (polypropylene (PP), polyamide (PA), composite, etc.) is provided for the thin sheet. At 104, the thin sheet is made by extruding a polymer or polymer composite through a sheet die to a thickness of approximately 0.25 mm to 0.5 mm (at 106). Extrusion parameters can vary depending on the material and, as such, are given in a materials process sheet as a general guide. Examples of twin-screw extrusion parameters for common polymers are shown in Table 1. Minor adjustments may be necessary based on a screw configuration and what is being extruded such as a strand for pelletization, a profile such as a tube or square, or a flat sheet. The temperature of the sheet die needs to increase as the thickness decreases to allow flow out of the die. The sheet exiting the die must be heated sufficiently to allow for calendering to a thickness of about 0.05 mm to 0.3 mm. Examples of suitable polymers and properties are shown in Table 2.

TABLE 1

Twin screw extrusion conditions

| | Extruder conditions (° C.) | | | |
|---|---|---|---|---|
| Polymer | Die | Front | Center | Rear |
| LDPE | 180-200 | 180-190 | 170-180 | 160-170 |
| HDPE | 220-230 | 210-220 | 200-210 | 190-200 |
| PP | 230-250 | 220-230 | 210-210 | 200-210 |
| Nylon | 240-270 | 240-260 | 235-250 | 230-235 |

TABLE 2

Property ranges of common polymers

| Polymer | TS (MPa) | TM (MPa) | Density (g/cc) | $T_m$ (° C.) | $T_g$ (° C.) | Volume resistivity (Ω-cm) | Thermal conductivity (W/m · K) |
|---|---|---|---|---|---|---|---|
| PP | 20-45 | 900-1,900 | 0.90-0.92 | 135-165 | −10 | $>10^{15}$ | 0.15-0.23 |
| PS | 27-55 | 1,900-3,500 | 0.96-1.10 | 200-250 | 100 | $>10^{14}$ | 0.16-0.18 |
| PBT | 34-60 | 1,600-2,700 | 1.22-1.31 | 200-271 | 60 | $>10^{13}$ | 0.16-0.27 |
| Nylon 66 | 30-93 | 1,600-3,300 | 1.07-1.14 | 220-268 | 70 | $>10^{13}$ | 0.25-0.70 |
| ABS | 22-57 | 1,700-3,200 | 1.10-1.20 | 190-270 | 105 | $>10^{15}$ | 0.14-0.21 |

Figure 2:
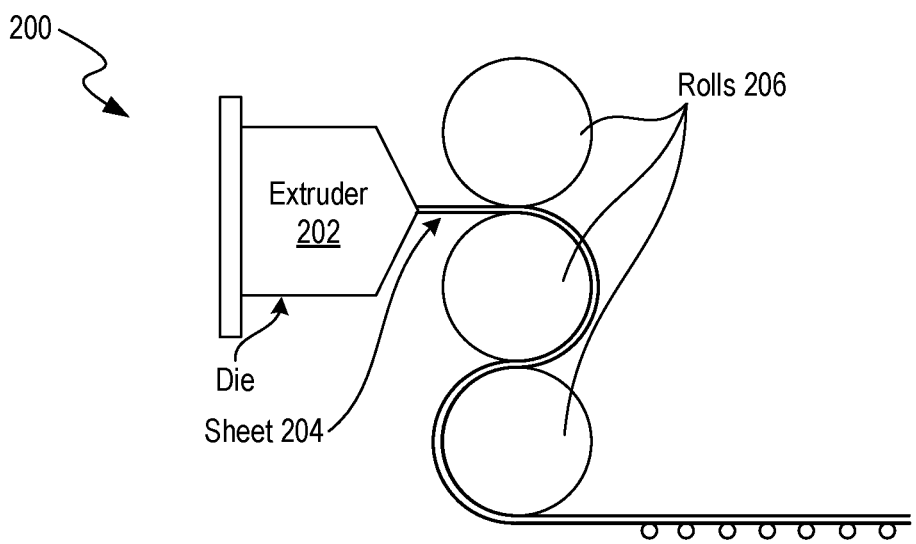
FIG. 2 illustrates a polymer melt exiting the extruder sheet die and then calendered to a thickness of 0.10 mm.

At 108, the calendering process receives the extruded sheet directly from the sheet die of the extruder. The hot sheet is fed into a nip roller (or a series of nip rollers) capable of being adjusted downward in thickness. In one example, the rollers can be heated up to 200° C. using a circulating oil bath. The heated rollers maintain the temperature of the extruded sheet during the calendering process. An example of a system that performs a calendering process is shown in FIG. 2. As shown, a calendering system 200 can perform a process of smoothing and compressing material from the extruder 202 during production by passing a single continuous sheet 204 through a number of heated rollers 206. The rollers 206 are constructed of steel with a hardened surface, or steel covered with fiber. The sheet 204 is then cooled. At 110 of FIG. 1, the sheet is cut into sections referred to as "notched sections" or "thin walls." The sections are then assembled into the connector at 112.

Figure 3:
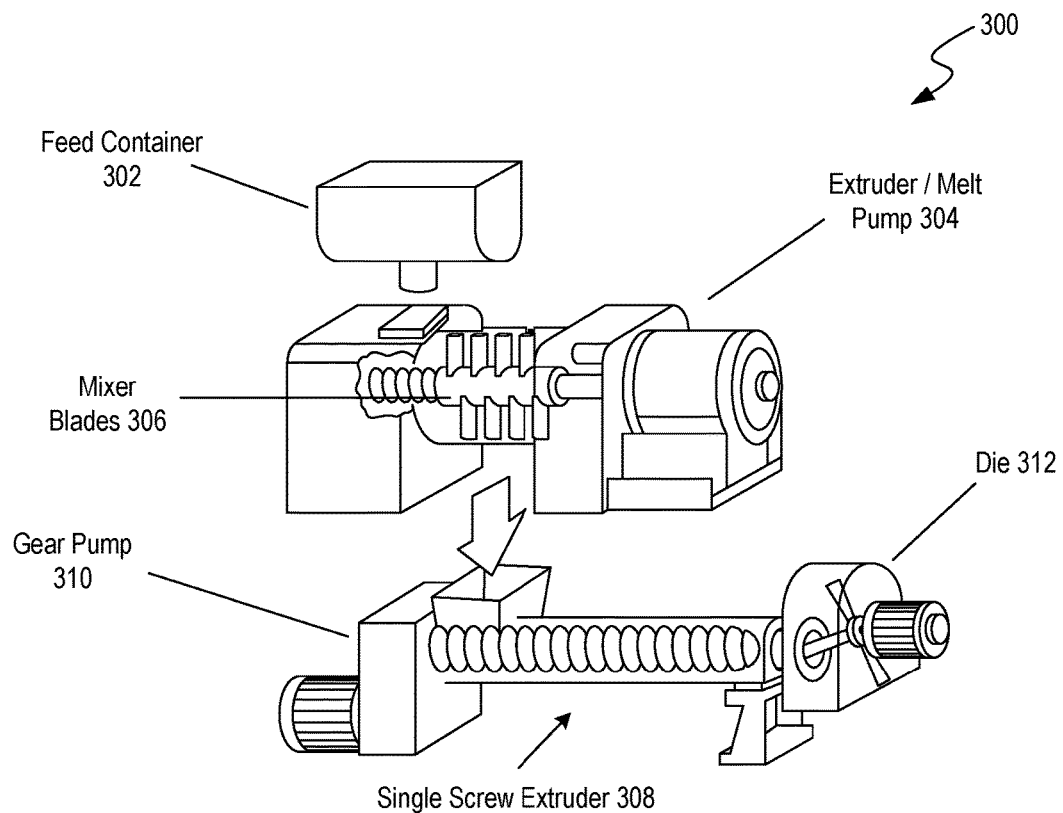
FIG. 3 illustrates a thermokinetic mixing process feeding compounded material into an extruder/melt pump connected to a strand die, profile die, or sheet die.

FIG. 3 shows a thermokinetic mixer 300 that can produce batch-processed material introduced into a hopper. The thermokinetic mixer 300 performs a thermokinetic mixing process feeding the compounded material into a product feed container 302 of an extruder/melt pump 304 connected to a strand die, profile die, or sheet die. The mixer blades 306 spin at high speed and contact the material and produce frictional heating. The melting and compounding of a material typically last less than 1 minute. The hot discharge is fed into a single screw extruder 308 having a gear pump 310 that maintains a constant feed rate into a die 312. In the illustrated example, the die 312 produces a strand for pelletizing. In another example, the die produces a hot sheet, which is calendered to the desired thickness.

In another embodiment, a method includes obtaining prefabricated thin polymer films that are cut to make the interior walls of the connector and/or insert. The thin sheets can be laminated to add functionality to the thin walls. Functional examples include:

A low-friction surface such as PTFE (Teflon®) or a similar type of material.
Electromagnetic interference (EMI) shielding layers laminated between two non-conductive polymer layers.
Printed thin film circuits laminated into the connector wall as a sensor or part of an electrical circuit.
Composite with alternating fiber directions to add stiffness to the wall.

In one example, lamination is performed by co-extruding several sheets having similar or different properties. Each polymer or polymer composite is melted into the sheet die. The sheet die can have one or multiple manifolds depending on the number or layers that are being extruded.

Figure 4A:
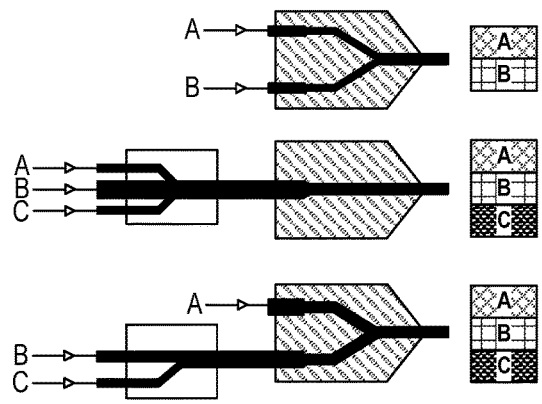
FIG. 4A illustrates a co-extrusion process for producing a multilayer sheet.
Figure 4B:
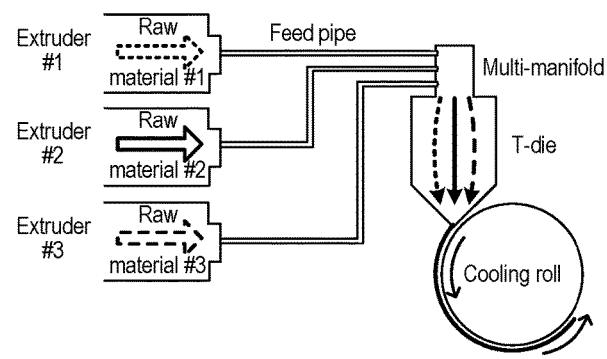
FIG. 4B illustrates a detailed process for producing a multilayer sheet.

FIGS. 4A and 4B illustrate a co-extrusion process where materials such as polymer(s) or polymer composite(s) from an extruder enter the sheet die forming a multilayer sheet. In particular, FIG. 4A shows materials A, B, and/or C processed through sheet dies to form single multilayer sheets. FIG. 4B shows a more detailed process wherein each material requires its own extruder for introduction into the sheet die. Previously extruded sheets can be introduced into the line and placed on or between the hot melted sheets exiting the sheet die process (not shown).

Figure 5:
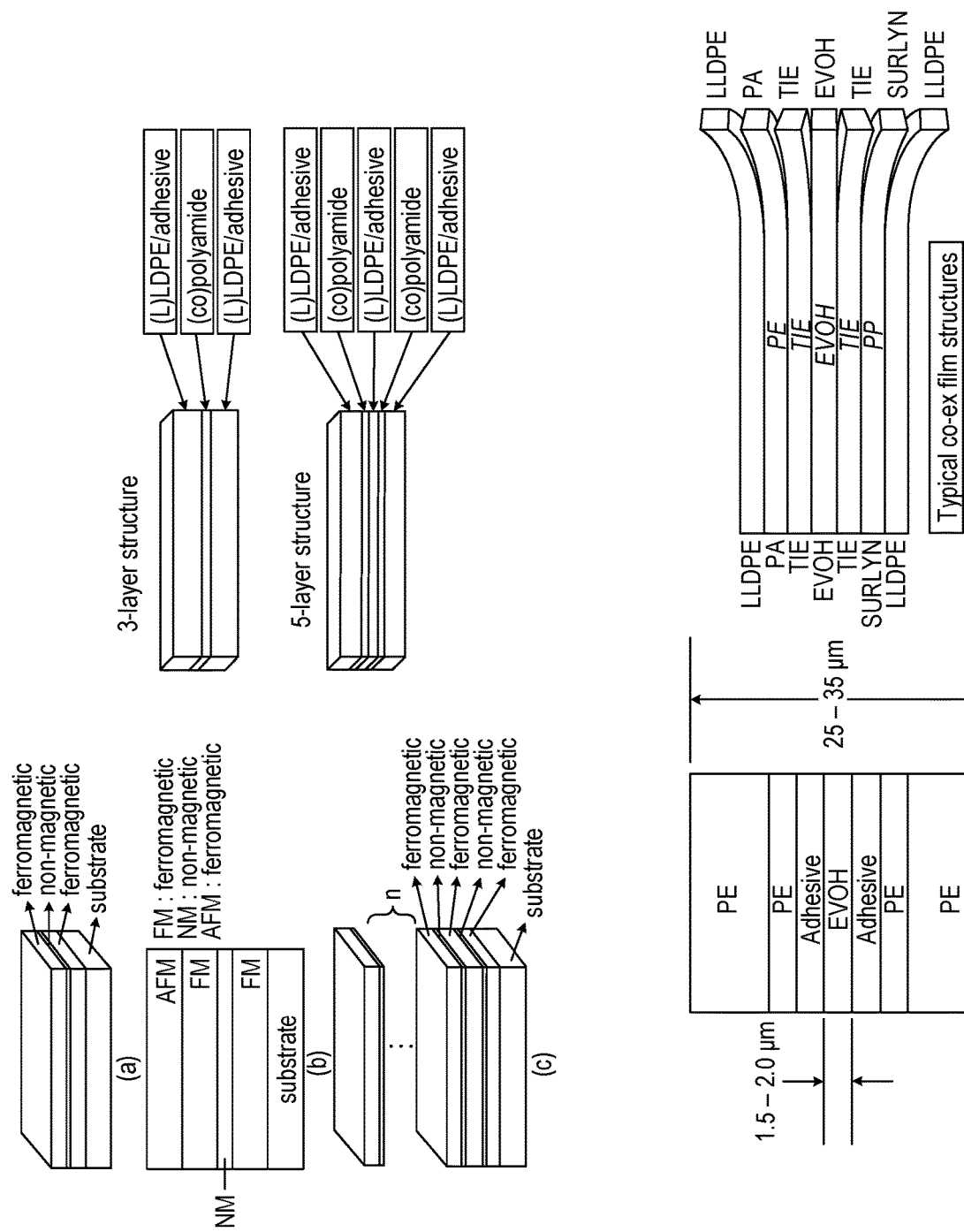
FIG. 5 illustrates examples of multiple sheets laminated into one sheet by using a co-extrusion process.

FIG. 5 illustrates examples of multiple sheets laminated into one sheet by using a co-extrusion process. Specifically, FIG. 5 shows examples of co-extruded sheets laminated into a multi-structure film. In some embodiments, individual wall sections are compression molded. In one example, compression molding is performed by using a preform puck of the desired material or composite material.

FIG. 6A illustrates compression molding of a preformed polymer or polymer composite puck into a part. FIG. 6B shows a multilayer compression molded sheet fabricated by placing individual layers 602-1 through 602-4 containing fiber oriented in different directions 604-1 through 604-4 to add stiffness. The layers 602-1 through 602-4 can be stacked prior to compression molding into a preformed structure. Alternatively, a single sheet can be prepared containing the oriented layers which is then compression molded. Multilayer sheets can be molded using different polymers, polymer composites, or combinations thereof.

The preformed structure is placed into a mold that is machined with the shape of the interior wall of the connector. Multiple interior wall sections can be machined into a single mold with each cavity having its own preform. The mold platens are heated above the melting temperature of the polymer. The platens are pressed together using a hydraulic press. The preform melts and fills the mold. Further, the platens are raised, and the wall sections can be removed. Any flashing that occurred during pressing is removed.

Compression molded sheets can be made using, for example, Polyamide 6 (PA6) nylon and PA6 nylon composite pellets. For example, the pellets can be placed into a 250° C. heated mold and compressed into a thin sheet using a hydraulic press. Different gram amounts and pressures can be used. Example data are shown in Table 3 with plaque thickness. In one implementation, tensile test specimens were die cut from the sheets and measured for strength, modulus, and elongation. The resulting data are shown in Table 4. The measured tensile properties for the thin nylon sheets are similar to the manufacturers' data. Flexural and impact properties include high flexibility. Sheets made for thin wall applications can have tensile properties similar to those shown in the manufacturer's data sheet. However, if stiffness is a problem, one of the processes described earlier can be used.

TABLE 3

Compression molding conditions and plaque thickness.

| PA6 composite material | Grams/tons | Plaque thickness (mm) |
|---|---|---|
| PA6 resin (K-222D) | 2/15 | 0.09-0.11 |
| | 2/30 | 0.09-0.10 |
| | 3/15 | 0.08-0.11 |
| | 3/30 | 0.09-0.11 |
| | 3/40 | 0.10-0.11 |
| PA6 (K-222D) + 2 wt. % MWCNT/ 15 wt. % Al fiber | 2/15 | 0.09-0.12 |
| | 2/30 | 0.11-0.13 |
| | 3/15 | 0.11-0.15 |
| | 3/30 | 0.12-0.14 |
| | 3/40 | 0.12-0.15 |

TABLE 4

Summary of tensile properties for the PA6 and PA6 composite sheets.

| PA6 composite | Resin | MWCNT (wt. %) | Al fiber (wt. %) | Tensile Strength (MPa) | Tensile Modulus (MPa) | Elongation (%) |
|---|---|---|---|---|---|---|
| K-222D (Spec sheet- conditioned) | PA6 | 0 | 0 | 55 | 1,200 | 25 |
| K-222D | PA6 | 0 | 0 | 48 ± 11 | 879 ± 169 | 36 ± 33 |
| MWCNT | PA6 | 0.8 | 0 | 62 ± 3 | 1,272 ± 92 | 20 ± 3 |
| MWCNT | PA6 | 2 | 0 | 68 ± 1 | 1,414 ± 46 | 21 ± 1 |
| Al fiber | PA6 | 0 | 15 | 42 ± 3 | 1,432 ± 13 | 10 ± 1 |
| Al fiber/MWCNT | PA6 | 2 | 15 | 41 ± 7 | 1,681 ± 50 | 8 ± 1 |

Insert Formation

A thin sheet is cut and notched to form the thin walls for an interior of the connector. In one example, the thin sheet is cut using a continuous wave laser. FIG. 7 illustrates an example of a plastic material being cut into two pieces with a laser. In one implementation, tolerances for laser cutting are approximately 0.025-0.13 mm depending on the thickness of the material. A $CO_2$ laser that is commonly used in industry for cutting can be used to cut clean edges. Moreover, intricate patterns can be cut quickly with a laser. The amount of power can vary depending on the material type and thickness. $CO_2$ laser systems are typically 60-600 watts and can cut with speeds from 1 mm/s-1,500 mm/s. Plastic and plastic composite materials can be cut using a laser. Examples of different plastic types that can be cut with a $CO_2$ laser include:

Polyamide (PA)
Polycarbonate (PC)
Polyethylene (PE)
Polypropylene (PP)
Polybutylene terephthalate (PBT)
Polyoxymethylene (POM)
Polyarylsulfone (PSU, PPSU)
Poly ether ketone (PEEK)
Acrylonitrile butadiene styrene copolymer (ABS)

In addition to the materials above, various types of glass-fiber reinforced plastic (GFRP), commonly called "fiberglass," can also be laser cut.

In some embodiments, cutting and notching of the thin sheet is performed using a steel rule die. In one example, the die is bent from a thin blade and then pressed into the material to cut a shape with tolerances of about 0.1 mm. In another example, a similar process for a rotary die cutting is used. The die is on a cylinder and rolls over the material cutting the desired shape. The individual sections can be die cut while still hot after the calendering process. This may be easier than cutting sheets that have already cooled.

In another embodiment, additive manufacturing (e.g., 3D printing) is used to produce the grid or connector having the desired number of sockets and interior wall thickness. The cutting die can be made using a wire electrical discharge machining (EDM) process. For example, a design can be burned out of metal to form the die. This method can be accurate with tolerances of about 0.001 mm.

Figure 8:
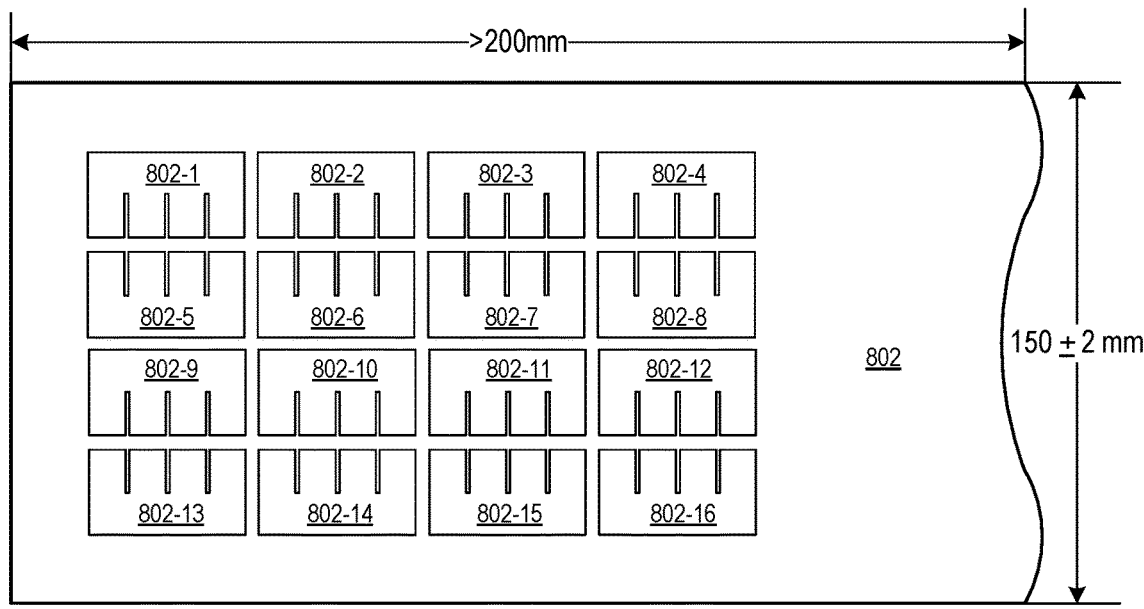
FIG. 8 illustrates an extruded sheet with wall sections cut using a laser, stamp, or die.
Figure 9:
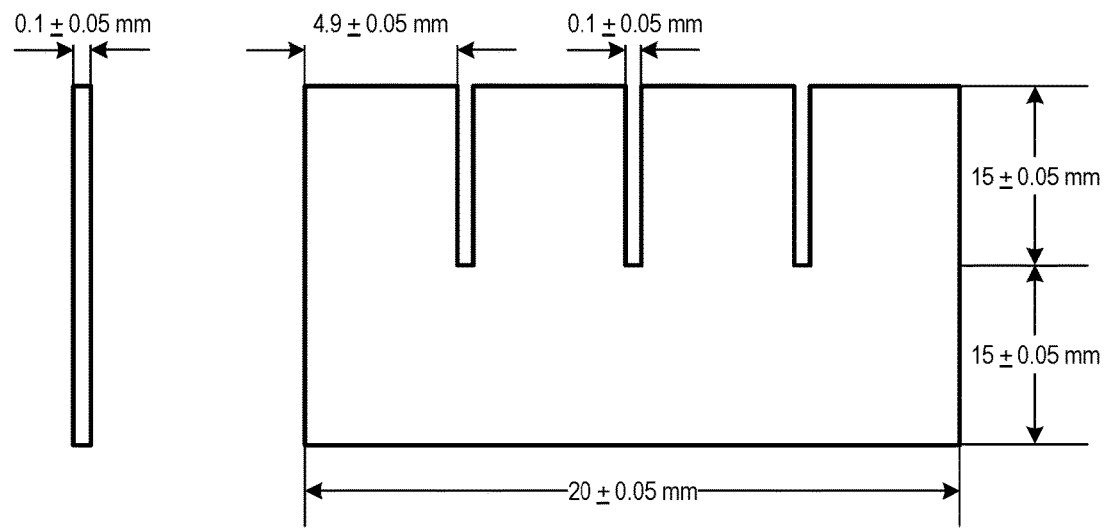
FIG. 9 illustrates example dimensions of a cut sheet section.

FIG. 8 illustrates an example of an extruded sheet 800 with cut wall sections 802-1 through 802-16. The wall sections can have a thickness of about 0.05 mm to 0.3 mm. FIG. 9 illustrates the relative dimensions of a wall section, according to one example. In the illustrated example, a wall is formed of a 0.05 mm thick extruded and calendered sheet with wall sections that are cut using a laser, stamp, or die. The dimensions vary according to the connector type being assembled. The stamp can be made using a steel rule method. For example, thin sharp blades are placed into a frame. The frame is pressed into the plastic sheet cutting the desired shape. The stamp can also be placed onto a rotating cylinder. This method allows for continuous cutting after the calendered sheet comes off the rollers. The stamp can be machined using a computer numerical control (CNC) process and then mounted onto a press or cylinder. In one example, die casting is used to make a stamp of the desired shape.

In one example, the cut and notched sheets are assembled manually or by an automated process similar to processes performed by commercial cardboard partition assembly machines. An example of an efficient method includes a pick-and-place robotic system. The system includes equipment that can handle very small parts and can place them with precision. A jig can be used to place the wall sections together in a particular configuration. Alternatively, the grid is assembled by using an injection molded base, where the molded base contains slots for each sheet. A small amount of adhesive can be used to secure the wall section in place. If the slots in the base are sized correctly (slightly narrower than the wall section), the sheet sections can be pushed into each slot with pressure using a force-fit.

Figures 10A, 10B:
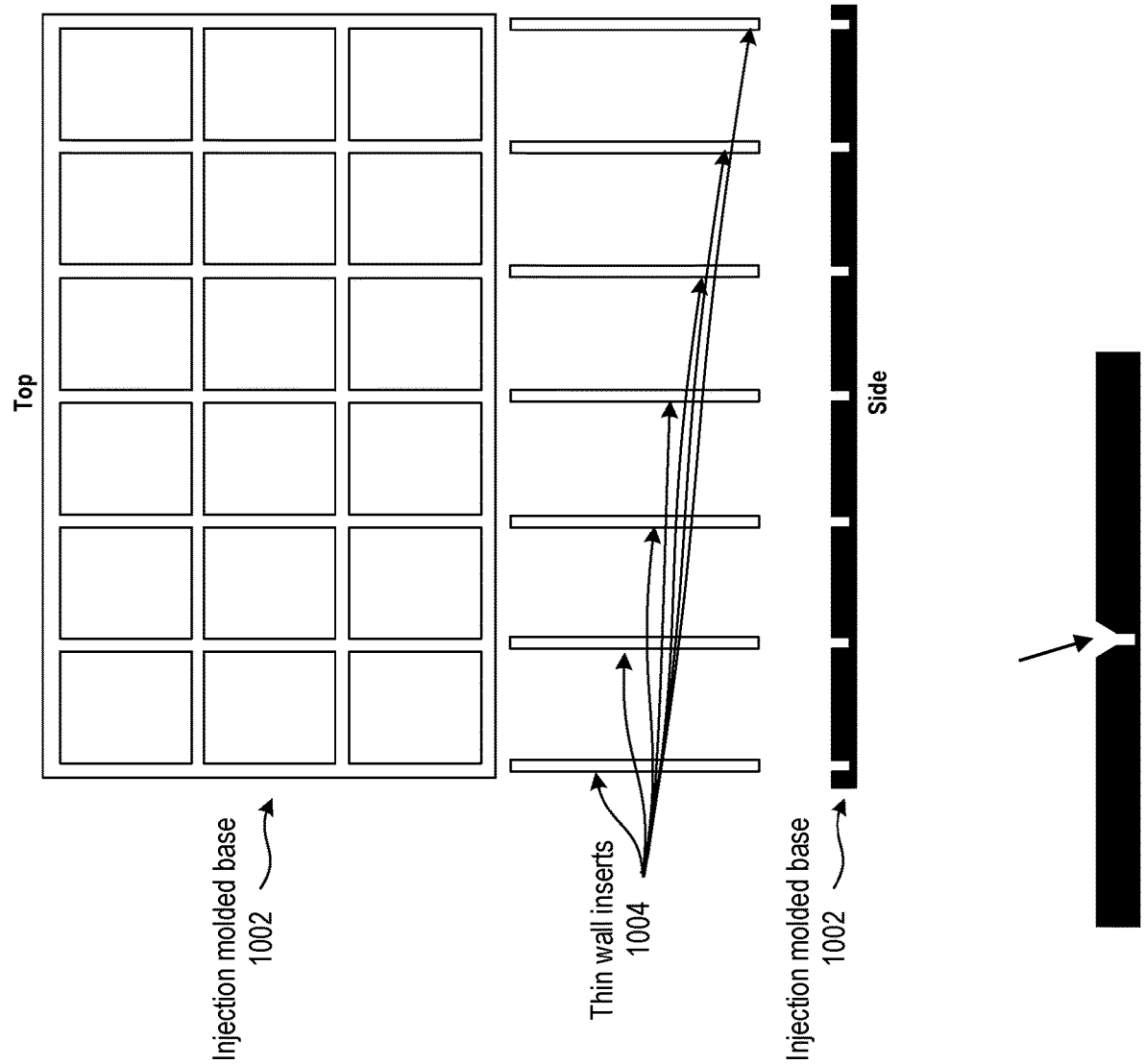
FIG. 10A illustrates an injection molded base with slots for each sheet section and the wall sections being pushed into each slot.
FIG. 10B illustrates a tapered slot for wall assembly into an injection molded base.

For example, FIG. 10A illustrates an injection molded base 1002 with slots for each sheet section, and the thin wall inserts 1004 are sections that are pushed into each slot of the injection molded base 1002. To help with assembly, the slots in the base can be tapered to allow for easier placement of the walls. FIG. 10B illustrates a tapered slot for easier wall assembly into a base. The individual sheet sections can be secured together by using an adhesive, laser welding, or ultrasonic welding. Hence, the insert assembly process is adaptable. The number of openings and dimensions can vary depending on how the sheet sections are made and notched, and how sections are assembled into the final insert.

Figure 11:
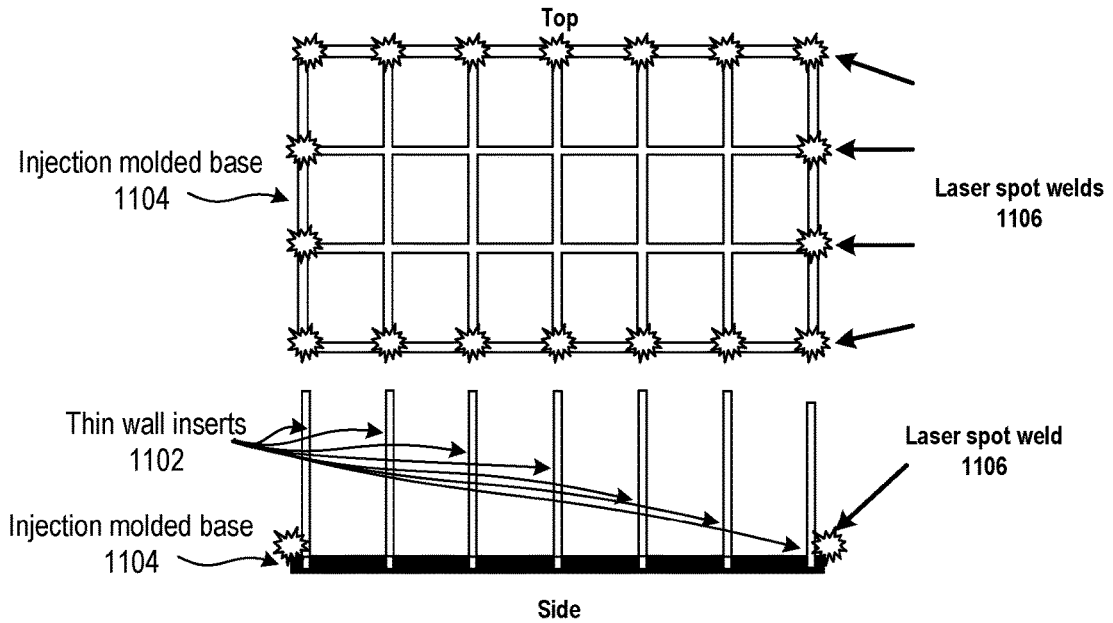
FIG. 11 illustrates thin walls inserted into an injection molded base.

In one example, welding is performed using a laser. Parameters can be computer controlled for power and accuracy during the welding process. Diode lasers ($\lambda$=800 nm-1,000 nm) have the advantage of low cost, small size, and high energy efficiency. Nd:YAG lasers ($\lambda$=1,064 nm) are larger and have a better beam quality than a diode laser. Fiber lasers ($\lambda$=1,070 nm-1,100 nm) can produce smaller beams and higher energy density at lower power. A possible disadvantage to laser welding is that the beam will transmit through plastic and will not be absorbed at the surface to create a weld. In this case, an absorber (e.g., paint, coating, or powder) specific to the laser wavelength can be applied to the surface. The absorber can also be incorporated into the plastic during the compounding process. Carbon black and organic materials are used in industry, although for connector housings, conductive carbon content must be kept sufficiently low to avoid imparting conductivity in the welded sheets. FIG. 11 illustrates thin wall inserts 1102 inserted into a previously injection molded base 1104, with laser spot welds 1106 at the interfaces of the walls and base. The spot welds 1106 are on the exterior of the insert where the thin wall inserts 1102 are inserted into the base 1108.

In some embodiments, ultrasonic welding is used. A horn is designed for the area to be welded, where the horn contacts the surface and produces a frequency between 20 kHz-35 kHz. The friction melts the plastic directly at the contact points. Parts typically have very little thermal stress from the welding process. The thin walls can be welded at each 90° intersection. Examples of plastics that can be welded using an ultrasonic process include PEEK, Polyphenylsulfide (PPS), PA6, PA66, PBT, POM, PP, High Density Polyethylene (HDPE), Low Density Polyethylene (LDPE), Ethylene-vinyl acetate (EVA), and amorphous polymers PPE, PPSU, PSU, PC, ABS, PMMA, ASA, and PVC. Glass fiber-filled composites of many of these polymers can also be welded by an ultrasonic process. In fact, the presence of glass fiber has been reported to enhance sound transmission and increase efficiency of the welding process.

Connector Assembly

Figure 12:
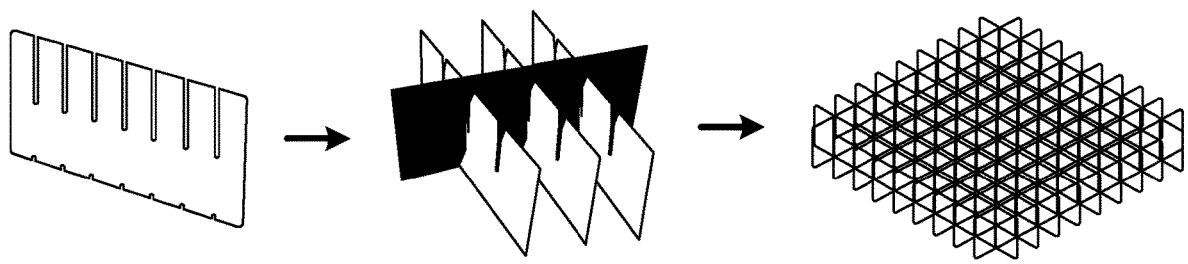
FIG. 12 illustrates a process for assembling an insert structure including a grid of thin walls
Figure 13:
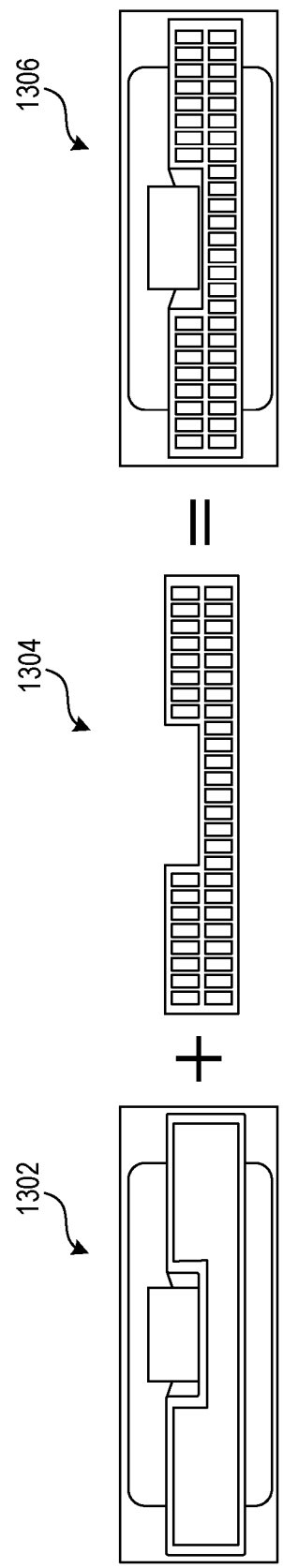
FIG. 13 illustrates a process for assembling a connector housing with an insert structure.

FIG. 12 illustrates a process for assembling an insert structure including a grid of thin walls. In one embodiment, an assembled insert is placed into an injection molded housing of a connector that has no interior walls. For example, FIG. 13 illustrates a process for positioning notched sections to form a grid of thin walls in an interior of a housing 1302 of the connector. The assembled insert 1304 is secured into the connector housing 1302 by using, for example, force-fit, snap-fit, an adhesive, or a welding process. As such, for example, the assembled insert 1304 and housing 1302 are interlocked when snap-fit or force-fit together 1306. The assembled insert 1304 can be placed into the housing 1302 by using a computer-driven robot where the housing 1302 is over-molded around the insert 1304. In another example, the notched sections are inserted (e.g., individually) into slots of a base of the housing 1302. The insert of individual notched sections can be secured in place by using an adhesive or welding process, for example. If the thin walls or the base are made from a thermoset, welding cannot be done. Instead, an adhesive such as epoxy or a cyanoacrylate is used.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not all necessarily referring to the same embodiment, nor are separate or alternative embodiments mutually exclusive of other embodiments. Moreover, various features are described, which may be exhibited by some embodiments and not by others. Similarly, various requirements are described, which may be requirements for some embodiments but not for other embodiments.

The terms used in this description generally have ordinary meanings in the art, within the context of the disclosure, and in the specific context where each term is used. Certain terms that are used to describe the disclosure are discussed above, or elsewhere in the description, to provide additional guidance to the practitioner regarding the description of the disclosure. It will be appreciated that the same thing can be said in more than one way. For example, one will recognize that "plastic" is one form of a "polymer" and that the terms may, on occasion, be used interchangeably.

Alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this description, including examples of any term discussed herein, are illustrative only and are not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method for manufacturing an electrical connector, the method comprising:
   extruding a polymer or polymer composite into a first sheet having a thickness of about 0.25 mm to 0.5 mm;
   calendering the first sheet into a second sheet having a thickness of about 0.05 mm to 0.3 mm;
   cutting the second sheet into notched sections;
   positioning the notched sections to form a grid of thin walls configured for an interior of a housing of the electrical connector;
   assembling a structure including the grid of thin walls;
   inserting the structure into the interior of the housing to form the electrical connector; and
   securing the grid of thin walls to the interior of the housing.

2. The method of claim 1, wherein positioning the notched sections to form the grid of thin walls comprises:
   placing the notched sections into slots of an injection molded base.

3. The method of claim 2:
   wherein the slots of the injection molded base are tapered to receive the notched sections, or
   wherein edges of the notched sections are tapered to ease placement into the molded base.

4. The method of claim 1, wherein positioning the notched sections to form the grid of thin walls comprises:
   positioning the notched sections with a pick-and-place robotic system.

5. The method of claim 1, wherein inserting the structure into the interior of the housing comprises:
   force-fitting or snap-fitting the structure into the housing.

6. The method of claim 1, wherein the housing is an injection molded structure.

7. The method of claim 1, wherein cutting the second sheet into notched sections comprises:
   cutting the notched sections with a laser light system, a steel rule die, or a stamp.

8. The method of claim 1 wherein the polymer or polymer composite comprises a pigment or surface treatment that is absorbent to laser light.

9. The method of claim 8 further comprising:
   laser welding the grid of thin walls to one or more surfaces of the interior of the housing.

10. The method of claim 1, wherein securing the grid of thin walls to the interior of the housing further comprises:
    securing the grid of thin walls to the interior of the housing with an adhesive.

11. The method of claim 1, wherein securing the grid of thin walls to the interior of the housing further comprises:
    securing the grid of thin walls to the interior of the housing with an ultrasonic welding process that melts a polymer at one or more contact points of the grid of thin walls and the electrical connector.

12. A method for making a structure of thin interior walls for an electrical connector, the method comprising:
    extruding a polymer or polymer composite into a first sheet having a thickness equal to or less than 0.5 mm;
    calendering the first sheet into a second sheet having a thickness equal to or less than 0.3 mm;
    cutting the second sheet into notched sections; and
    positioning the notched sections to form the a grid of thin interior walls; and
    assembling the structure including the grid of thin interior walls,
    wherein the structure is configured to secure to an interior of a housing to form the electrical connector.

13. The method of claim 12 further comprising, prior to assembling the notched sections:
    laminating multiple sheets into one sheet of the thin walls.

* * * * *